US012464030B2

(12) United States Patent
Kulisz et al.

(10) Patent No.: US 12,464,030 B2
(45) Date of Patent: Nov. 4, 2025

(54) SELF-HEALING CONTENT SECURITY POLICIES

(71) Applicant: eBay Inc., San Jose, CA (US)

(72) Inventors: Jonathan Kulisz, San Antonio, TX (US); Shutanshu, Campbell, CA (US); Sudip Chakrabarty, San Jose, CA (US); Srinivas Hariharan, Bengaluru (IN); Piyush Pattanayak, Fremont, CA (US); Nishant Kumar Das Pattanaik, Bengaluru (IN); Anuj Kaul, Dublin, CA (US)

(73) Assignee: eBay Inc., San Jose, CA (US)

( * ) Notice: Subject to any disclaimer, the term of this patent is extended or adjusted under 35 U.S.C. 154(b) by 128 days.

(21) Appl. No.: 18/227,099

(22) Filed: Jul. 27, 2023

(65) Prior Publication Data

US 2025/0030747 A1     Jan. 23, 2025

(30) Foreign Application Priority Data

Jul. 21, 2023   (IN) .............................. 202311049317

(51) Int. Cl.
*H04L 29/00*     (2006.01)
*H04L 9/40*      (2022.01)
(52) U.S. Cl.
CPC ........ *H04L 63/205* (2013.01); *H04L 63/1433* (2013.01); *H04L 63/20* (2013.01)
(58) Field of Classification Search
CPC .... H04L 63/205; H04L 63/1433; H04L 63/20
See application file for complete search history.

(56) References Cited

U.S. PATENT DOCUMENTS

| 8,543,667 B2 | 9/2013 | Hluchyj et al. |
| 8,918,359 B2 | 12/2014 | Ahuja et al. |
| 9,015,844 B1 * | 4/2015 | Franklin ............... G06F 21/577 717/124 |

(Continued)

FOREIGN PATENT DOCUMENTS

| CN | 114830092 A | 7/2022 |
| WO | 2020/055484 A1 | 3/2020 |

OTHER PUBLICATIONS

Steve B., "How to Create a Content Security Policy (CSP Header," source: https://gridpane.com /blog/author/steve-admin/, published on Oct. 17, 2022. 15 pages (Year: 2022).*

(Continued)

*Primary Examiner* — Don G Zhao
(74) *Attorney, Agent, or Firm* — Shook Hardy & Bacon L.L.P.

(57) ABSTRACT

Systems and methods provide for self-healing content security policies (CSPs). In accordance with some aspects, CSP violation information is received identifying a CSP violation for a CSP header and a violating source for the CSP violation. The violating source for the CSP violation is compared against a list of trusted sources. Based on the comparison, a first trusted source in the list of trusted sources is identified as matching the violating source for the CSP violation. Responsive to identifying the first trusted source as matching the violating source, a CSP definition associated with the CSP header is caused to be updated to include a source value based on the violating source or the first trusted source to provide an updated CSP definition.

17 Claims, 7 Drawing Sheets

(56) References Cited

U.S. PATENT DOCUMENTS

| | | | |
|---|---|---|---|
| 9,154,492 | B2 | 10/2015 | Chu et al. |
| 9,558,017 | B2* | 1/2017 | Plate ................... G06F 21/577 |
| 10,432,662 | B2 | 10/2019 | Sethi et al. |
| 10,509,914 | B1* | 12/2019 | Desai ................... G06F 21/604 |
| 10,581,878 | B2 | 3/2020 | Ng et al. |
| 10,678,910 | B2 | 6/2020 | Ng et al. |
| 10,778,687 | B2 | 9/2020 | Rajahram et al. |
| 10,817,424 | B1 | 10/2020 | Amrani et al. |
| 10,868,802 | B2* | 12/2020 | Westerlund ......... H04L 63/0823 |
| 11,057,432 | B2* | 7/2021 | Ni ....................... H04L 41/0806 |
| 11,128,639 | B2 | 9/2021 | Bergbom et al. |
| 11,144,342 | B2* | 10/2021 | Schulze .............. G06F 9/45558 |
| 11,528,301 | B1 | 12/2022 | Saraf et al. |
| 2010/0064342 | A1* | 3/2010 | Nakagawa ............ G06F 21/552 726/1 |
| 2011/0093768 | A1* | 4/2011 | Panwar ............... G06F 21/6245 714/809 |
| 2015/0047051 | A1 | 2/2015 | Johns et al. |
| 2017/0208370 | A1* | 7/2017 | Ray .................... H04N 21/2543 |
| 2019/0238544 | A1* | 8/2019 | Rajahram ............. H04L 63/101 |
| 2020/0092333 | A1* | 3/2020 | Sebesta ................... H04L 63/14 |
| 2022/0116787 | A1 | 4/2022 | Balan et al. |
| 2022/0337630 | A1 | 10/2022 | Kipp et al. |
| 2022/0345497 | A1 | 10/2022 | Bhatkar et al. |
| 2023/0122784 | A1 | 4/2023 | Khan et al. |

OTHER PUBLICATIONS

Content Security Policy (CSP) violation error during Proxy Now, SAP Knowledge Base Article, Retrieved from Internet URL:<https://userapps.support.sap.com/sap/support/knowledge/en/3059464>, Accessed on May 12, 2023, 3 pages.

CSP violation report, Retrieved from Internet URL:<https://csplite.com/csp66/#violation-report>, Accessed on May 12, 2023, 6 pages.

Banach, "Using Content Security Policy (CSP) to Secure Web Applications", Invicti, Retrieved from Internet URL: <https://www.invicti.com/blog/web-security/content-security-policy/>, Mar. 27, 2020, 13 pages.

Calzavara et al., "Content Security Problems? Evaluating the Effectiveness of Content Security Policy in the Wild", Proceedings of the 2016 ACM SIGSAC Conference on Computer and Communications Security, Oct. 24, 2016, pp. 1365-1375.

Google, "Create custom headers in backend services", GoogleCloud, Load Balancing, Retrieved from Internet URL: <https://cloud.google.com/load-balancing/docs/https/custom-headers>, Accessed on May 12, 2023, 10 pages.

Marsh, "Modifying HTTP response headers with Transform Rules", Cloudflare, Retrieved from Internet URL:<https://blog.cloudflare.com/transform-http-response-headers/>, Nov. 18, 2021, 11 pages.

Rothenberg, "HTTP::CSPHeader—manage dynamic content security policy headers", Metacpan, Retrieved from Internet URL:<https://metacpan.org/pod/HTTP::CSPHeader>, Accessed on May 12, 2023, 5 pages.

Anonymous : "Content Security Policy Wildcards?—Stack Overflow", Available at : <https://stackoverflow.com/questions/73615828/content-security-policy-wildcards>, Sep. 6, 2022, 2 pages.

Calzavara et al., "Semantics-Based Analysis of Content Security Policy Deployment", ACM Transactions on the Web, vol. 1, No. 1, 2017, 36 pages.

EP Communication received for European Application No. 24189666.1, mailed on Jan. 27, 2025, 2 pages.

EP Communication received for European Application No. 24189682.8, mailed on Jan. 27, 2025, 2 pages.

Extended European Search Report received for European Application No. 24189666.1, mailed on Dec. 3, 2024, 10 pages.

Extended European Search Report received for European Application No. 24189682.8, mailed on Dec. 6, 2024, 11 pages.

Hausknecht et al., "May I?—Content Security Policy Endorsement for Browser Extensions", Advances in Visual Computing, 2015, 20 pages.

Non-Final Office Action received for U.S. Appl. No. 18/227,089, mailed on Apr. 21, 2025, 10 pages.

Notice of Allowance received for U.S. Appl. No. 18/227,089, mailed on Sep. 9, 2025, 8 pages.

Notice of Allowance received for U.S. Appl. No. 18/227,089, mailed on Sep. 18, 2025, 1 pages.

* cited by examiner

402

404
style-src 'self' 'unsafe-inline' data: : ebay.com *ebay.de *ebaystatic.com *ebaystatic.de *ebaystatic.en *googleapis.com; connect-src 'self' *.ebay.com *.ebay.de *.ebaystatic.com *.ebaystati
c.de data: *.forter.com *.doubleclick.com *.paypal.com *.quantummetric.com *.ebaytm.com *.glance.net wss://*.glance.net *.perfdrive.com *.ravelin.click d2o5idwacg3gyw.cloudfront.net *.gstatic.co
m *.googlesyndication.com *.ebaying.com *.doubleclick.net *.googleapis.com ebay-tagan.adlighting.com wss://127.0.0.1:* *.ebay-us. com www.cloudflare.com google.com *.google.com; script-src 'self'
'unsafe-eval' 'unsafe-inline' blob: data: https://*: frame-ancestors 'self' *.ebay.com *.ebay.de *.ebaystatic.com *.ebaystatic.de: default-src 'self' blob: data: wss: mediastream: https://*; rep
ort-uri https://monitor.ebay.com/csp-report/checkout/ReviewYourPurchase?id=13401284748241983008&rid=f6%60modhjsssfo%3D9vjd%60modhjsssfo*73%3E2%3A20-18714ca9005-0x2b02#pd 406   408   410   412

FIG. 4.

SELF-HEALING CONTENT SECURITY POLICIES

CROSS-REFERENCE TO RELATED APPLICATIONS

This application claims priority to Indian Patent Application having Application No. 202311049317, filed in India on Jul. 21, 2023, entitled "DYNAMIC SOURCE VALUES FOR CONTENT SECURITY POLICIES," the entirety of which is hereby incorporated by reference.

BACKGROUND

Content Security Policy (CSP) is a security mechanism that helps to detect and mitigate certain types of attacks, including cross-site scripting (XSS) and data injection attacks. Web application administrators can define a set of CSPs that specify the types of resources, such as scripts, stylesheets, and images, that are allowed to be loaded and executed for a web application and valid sources for each of the different types of resources. By setting these policies, administrators can limit the potential vulnerabilities that can be exploited by malicious actors. When a web application is requested by a client device, a CSP header is returned in response with directives indicating the types of resources (e.g., JavaScript, CSS, images, etc.) that can be loaded and valid sources for the resources. The browser or other application executing the web application on the client device checks the CSP directives and enforces the defined restrictions, blocking or allowing requests based on the specified policies. This helps ensure that only trusted sources are allowed to interact with the web application, reducing the risk of code injection and other malicious activities.

SUMMARY

Some aspects of the present technology relate to, among other things, a CSP management system that facilitates CSP management, deployment, and violation reporting. The CSP management system allows administrators to generate and edit CSP definitions for various web applications and stores the CSP definitions in a repository. When a specific web application is requested by a client device, the CSP management system retrieves the CSP definition for the web application, generates a CSP header based on the CSP definition, and provides the generated CSP header as a response header to the requesting client device. When a CSP violation occurs, information regarding the violation is provided to the CSP management system. The information can include, for instance, information identifying the violating source (i.e., a source called by the web application that is not specified by the CSP header) and the CSP header/definition. The CSP management system compares the violating source against a list of trusted sources. If the CSP management system determines the violating source matches a trusted source, the CSP management system causes the corresponding CSP definition to be updated to include a source value based on the violating source/matching trusted source. As such, when a CSP header is subsequently generated using the update CSP definition, the CSP header includes the added source value such that if the web application attempts to call the source corresponding to the previous violating source, the call will no longer result in a violation.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 4 is a diagram illustrating an example CSP header in accordance with some implementations of the present disclosure;

DETAILED DESCRIPTION

Overview

Figure 1:
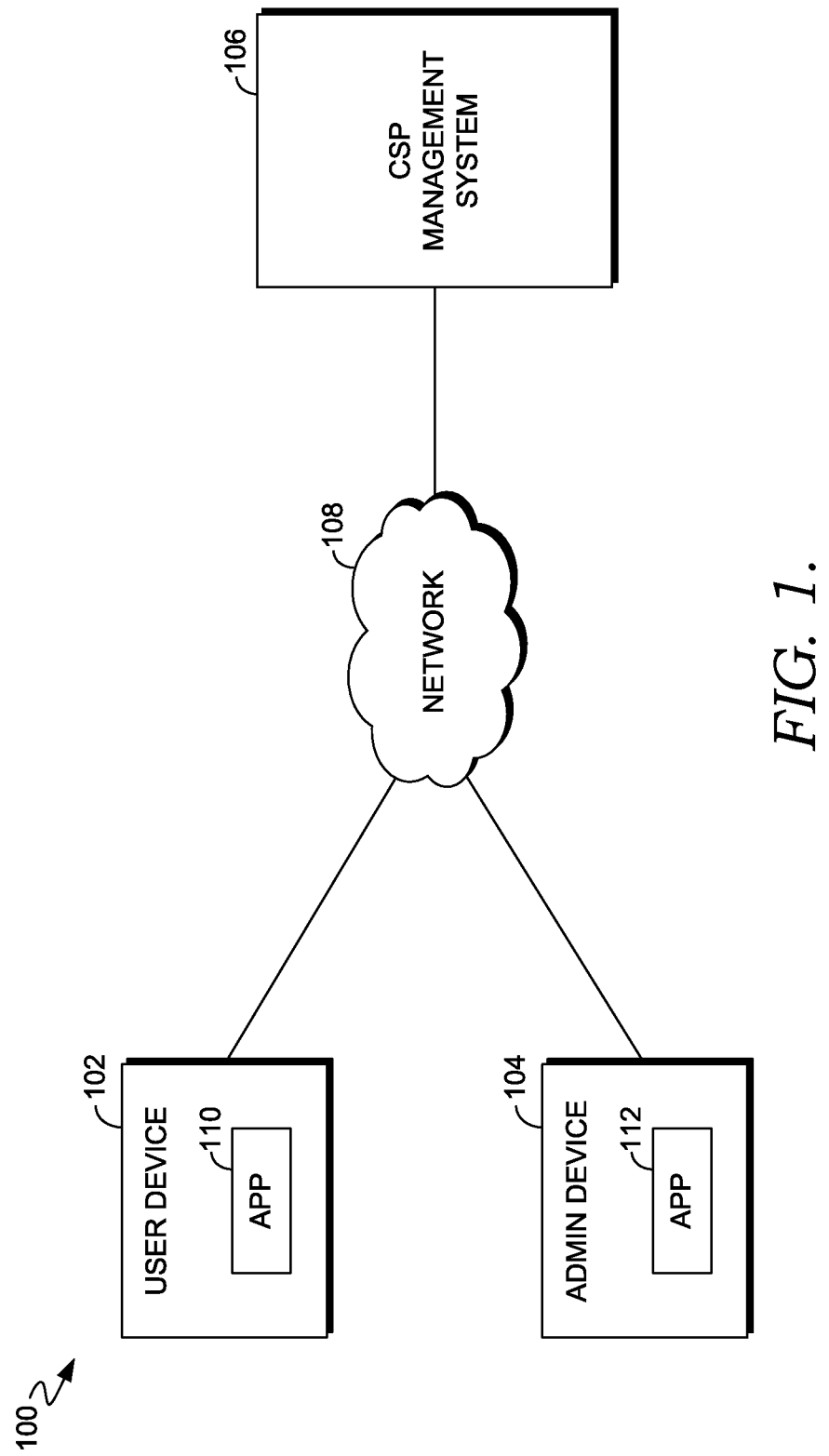
FIG. 1 is a block diagram illustrating an exemplary system in accordance with some implementations of the present disclosure.

Traditionally, CSP headers are hard coded into each web application by the administrators responsible for each web application. This can be difficult for an enterprise to maintain, especially when there are a large number of web applications with different dependencies and different development teams responsible for the various web applications. As used herein, the term "web application" refers broadly to any application, document, or other code that is accessed by a client device over a network and executed by and/or rendered by an application (e.g., a web browser) on the client device. Among other things, the term encompasses web pages that include dynamic content, interactive elements, or other functionality.

To address these challenges associated with conventional use of CSPs, in some aspects, the technology described herein provides a CSP management system for managing CSPs for web applications. Among other things, the CSP management system facilitates CSP management, deployment, and violation reporting. The CSP management system provides a repository of CSP definitions. Each CSP definition can correspond with one or more web applications and include source values identifying valid sources (e.g., domains) for the corresponding web application(s). Administrators can use existing CSP definitions, modify existing CSP definitions, and/or create new CSP definitions. When a web application is requested by a client device, the CSP definition for the web application is retrieved from the repository (e.g., a CSP definitions datastore or a cache), a CSP header is generated based the CSP definition, and the generated CSP header is sent to the client device as a response header. Any CSP violations that occur when executing web applications on client devices are reported to the CSP management system, which logs the violations. The CSP management system then provides administrators the ability to view the violations and manage CSP definitions based on the violations.

In accordance with some aspects of the technology described herein, the CSP management system facilitates updating CSP definitions based on CSP violations. A CSP violation occurs when an application (e.g., a web browser) executing a web application on a client device attempts to call a resource from a source not specified by the relevant directive of the CSP header. When a CSP violation occurs, information regarding the violation is provide to the CSP management system, including, for instance, information regarding the violating source (i.e., the source that was called but not specified by the CSP header), the web application, the CSP header/definition, and/or the relevant directive. The CSP management system compares the violating source against a list of trusted sources. The trusted sources include sources that are known to be safe (i.e., a whitelist), including, for instance, an entity's own sources and trusted third-party sources. If the CSP management system determines the violating source matches a trusted sources, the CSP management system causes the relevant CSP definition to be updated to include a source value corresponding to the violating source/matching trusted source. As such, when the web application is subsequently request by a client device, the CSP header includes the source value such that if the web application calls the source corresponding to the violating source, the source will no longer cause a violation.

Updating of the CSP definition can be performed automatically, semi-automatically or manually. When performed automatically, the CSP management system automatically identifies the relevant directive of the CSP header (e.g., based on the information regarding the CSP violation) and adds a source value to that directive. When performed semi-automatically, a user interface is initially provided to an admin device that identifies the violating source as matching the trusted source and includes a user interface element for selecting to update the CSP definition. If the user interface element is selected by the administrator, the CSP management system automatically updates the CSP definition to include the source value. When performed manually, a user interface is provided to an admin device that identifies the violating source as matching the trusted source. The administrator can review the information and employ the admin device to access the relevant CSP definition from the CSP repository and update the CSP definition by adding the source value.

Aspects of the technology described herein provide a number of improvements over existing technologies. For instance, aspects of the technology described herein increase security for web applications by providing a centralized platform for managing CSPs for various web applications. The ability of the CSP management system to update CSP headers based on violations resulting from trusted sources also improves performance. In particular, the updated CSP headers will no longer cause violations to occur when the corresponding source is called by web applications. Web application performance is also improved in turn by allowing resources to be retrieved from the trusted source. Advantageously, efficiencies of computing and network resources can also be enhanced using implementations described herein. In particular, the centralized updating of CSP headers for multiple web applications based on CSP violations provides for a more efficient use of computing resources (e.g., higher throughput and reduced latency for a network, less packet generation costs, etc.) than conventional methods of manually updating hard-coded CSP headers in web applications.

Example Content Security Policy System

With reference now to the drawings, FIG. 1 is a block diagram illustrating an exemplary system 100 for CSP management, deployment, and violation reporting in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102, an admin device 104, and a CSP management system 106. Each of the user device 102, admin device 104, and CSP management system 106 shown in FIG. 1 can comprise one or more computer devices, such as the computing device 700 of FIG. 7, discussed below. As shown in FIG. 1, the user device 102, the admin device 104, and the CSP management system 106 can communicate via a network 108, which can include, without limitation, one or more local area networks (LANs) and/or wide area networks (WANs). Such networking environments are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the CSP management system 106 could be provided by multiple server devices collectively providing the functionality of the CSP management system 106 as described herein. Additionally, other components not shown can also be included within the network environment.

The CSP management system 106 facilitates management, deployment, and violation reporting for CSPs. For instance, the CSP management system 106 can be employed by an entity having multiple web applications to manage CSPs for its web applications. The CSP management system 106 can be implemented using one or more server devices, one or more platforms with corresponding application programming interfaces, cloud infrastructure, and the like. Additional details regarding various components of the CSP management system 106 are described below with reference to FIG. 2

Among other things, the CSP management system 106 allows an administrator responsible for managing CSPs to generate and/or edit CSP definitions. In some configurations, the CSP management system 106 also logs violation reports for CSPs and provides information regarding CSP violations to the administrator. For instance, the CSP management system 106 can provide one or more user interfaces to the admin device 104 for CSP management and violation reporting. As shown in FIG. 1, the admin device 104 includes an application 112 for interacting with the CSP management system 106. The application 112 can be, for instance, a web browser or a dedicated application for providing functions, such as those described herein.

The CSP management system 106 further facilitates deployment of CSP headers when web applications are requested by user devices, such as the user device 102. When a request for a web application is received from the user device 102, the CSP management system 106 retrieves a CSP definition for the requested web application, generates a CSP header based on the CSP definition, and provides the CSP header as a response header to the user device 102. As shown in FIG. 1, the client device 102 includes an application 110 for interacting with the CSP management system 106. The application 110 can be, for instance, a web browser or a dedicated application for providing functions, such as those described herein.

The user device 102 and admin device 104 comprise any type of computing device capable of use by a user and administrator, respectively. For example, in one aspect, the user device 102 and admin device 104 each comprises the type of computing device 700 described in relation to FIG. 7 herein. By way of example and not limitation, the user device 102 and admin device can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device.

Figure 2:
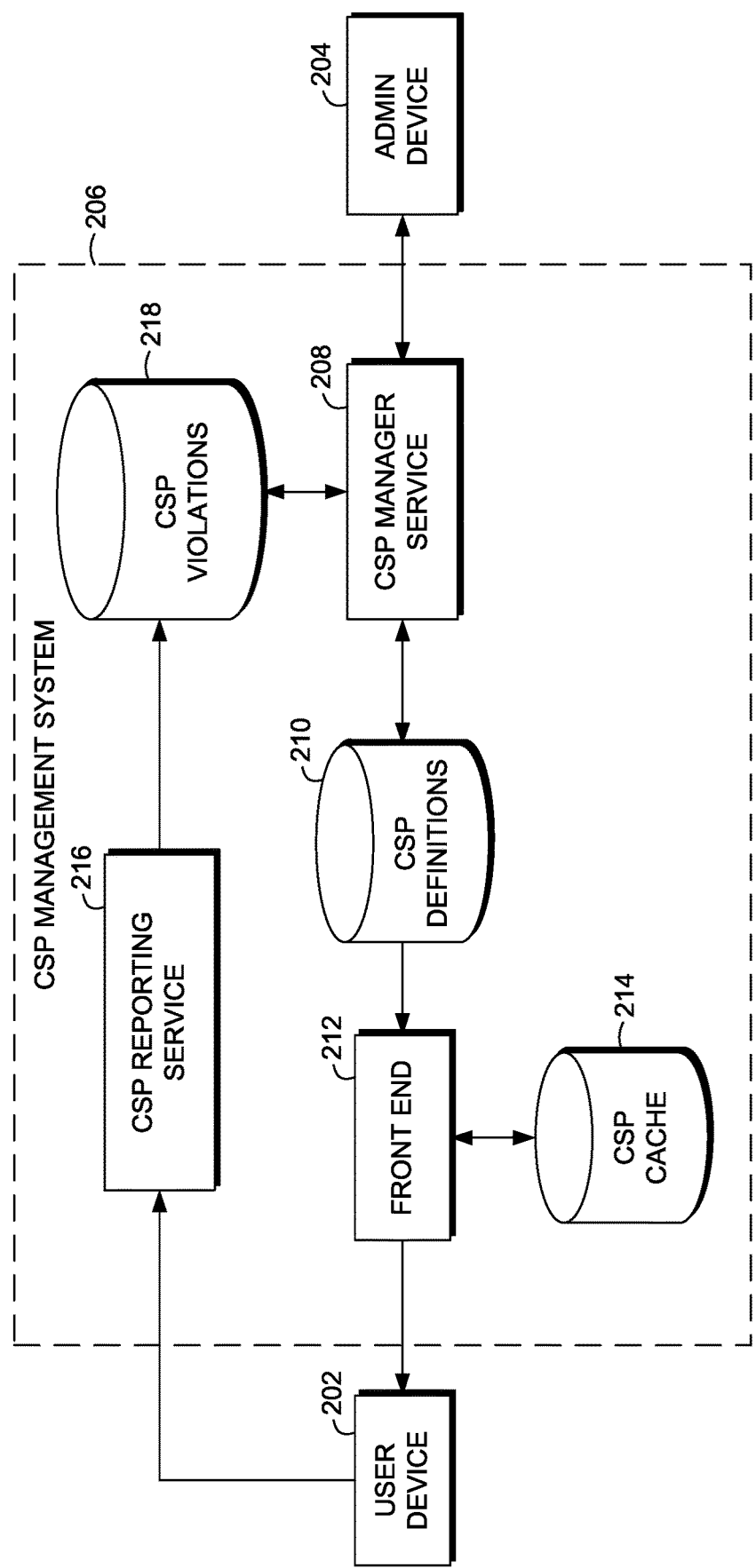
FIG. 2 is a block diagram illustrating an example CSP management system in accordance with some implementations of the present disclosure.

Turning next to FIG. 2, a block diagram is provided showing aspects of a CSP management system 206 (which can correspond to the CSP management system 106 of FIG. 1). The CSP management system 206 includes a number of components for CSP management, deployment, and violation reporting, including a CSP manager service 208, a frontend 212, and a CSP reporting service 216. The components of the CSP management system 206 can be in addition to other components that provide further additional functions beyond the features described herein.

In one aspect, the functions performed by components of the CSP management system 206 are associated with one or more applications, services, or routines. In particular, such applications, services, or routines can operate on one or more user devices, servers, can be distributed across one or more user devices and servers, or be implemented in the cloud. Moreover, in some aspects, these components of the CSP management system 206 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects, functionality of these components can be shared or distributed across other components.

CSP Management: The CSP manager service 208 of the CSP management system 206 facilitates the generation and modification of CSP definitions and stores the CSP definitions in a CSP definitions datastore 210. The CSP manager service 208 provides user interfaces to the admin device 204 (which can correspond to the admin device 104 of FIG. 1) for managing CSP definitions. In some instances, the user interfaces are provided by a CSP portal that allows the administrator to access and interact with various aspects of the CSPs. Among other things, the user interfaces allow an administrator using the admin device 204 to generate new CSP definitions, access and modify CSP definition templates, and access and modify existing CSP definitions. The user interfaces also allow the administrator to associate CSP definitions with various web applications. A single CSP definition or a group of CSP definitions can be associated with a single web application or a group of web applications. When a single CSP definition is associated with multiple web applications, only that single CSP definition needs to be edited to update the CSP header for each of those web applications. This is in contrast to traditional CSP management in which CSP headers are hard coded for each web application, which requires each CSP header to be edited each time a change is required that impacts multiple CSPs (e.g., when a new domain is added).

In some configurations, the CSP manager service 208 can control different administrators' access to and/or ability to modify different CSP definitions stored in the CSP definitions datastore 210. For instance, rights to individual CSP definitions or groups of CSP definition can be defined based on administrator role.

A CSP definition can comprise one or more directives. Directives are specific instructions that define the security policies for handling various types of resources for a web application. Each directive targets a specific type of resource and determines how it should be handled by the user device. By way of example, below is a list of commonly used directives in CSP:

default-src: Specifies the default policy for resources that don't have a specific directive.
script-src: Specifies the sources from which JavaScript code or other scripts can be loaded.
style-src: Specifies the allowed sources for CSS stylesheets.
img-src: Specifies the sources from which images can be loaded.
font-src: Specifies the allowed sources for fonts.
connect-src: Specifies the sources that can be requested using script interfaces.
frame-src: Specifies the allowed sources for embedded frames or iframes.
media-src: Specifies the sources from which media (e.g., audio or video content) can be loaded.
object-src: Specifies the allowed sources for plugins or embedded objects, such as Flash or Java applets.
form-action: Specifies the valid sources that can be used as the target for form submissions.

Each directive can specify one or more valid sources that are defined in the directive using source values, such as specific domains (e.g., ebay.com), domains with wildcard patterns (e.g., *.ebay.com covering all subdomains within the ebay.com domain), or keywords like 'self' (referring to the current domain) or 'none' (disallowing the resource type). The sources can be defined in a directive using static source values and dynamic source values. A static source value is one in which the source value specified in the directive remains the same when generating a CSP header using the CSP definition. A dynamic source value is one in which the source value specified in the directive is used to dynamically generate a source value that is included in the CSP definition at the time the web application is requested, as will be described in further detail below in the CSP deployment section. Each dynamic source value can be dynamic at the top-level domain, a second-level domain, and/or a subdomain. By configuring these directives appropriately, administrators can enforce stricter security policies and reduce the risk of various types of content-based attacks.

Figure 3:
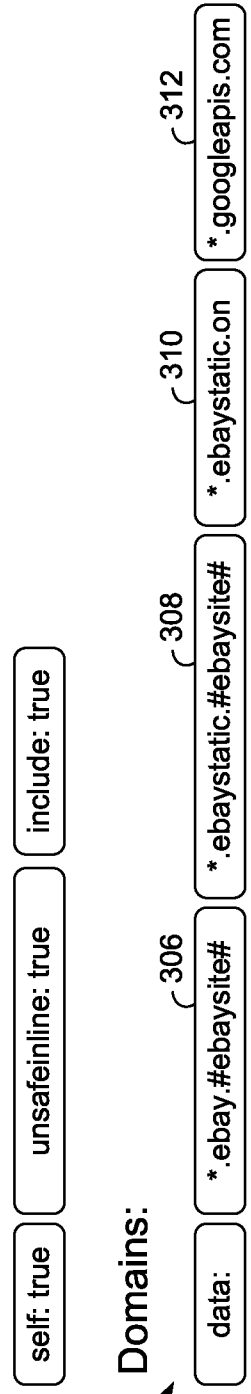
FIG. 3 is a diagram illustrating an example directive for a CSP definition in accordance with some implementations of the present disclosure.

By way of example to illustrate, FIG. 3 provides a screenshot showing a user interface for editing a style-src directive 302 for a CSP definition. For instance, an administrator using the admin device 204 of FIG. 2 could request an existing CSP definition or generate a CSP definition from scratch or using a template. If an existing CSP definition is requested, the CSP manager service 208 accesses the requested CSP definition from the CSP definition repository 210 and provides one or more user interfaces to the admin device 204, allowing the administrator to view and/or modify each of the directives of the CSP definition.

As shown in FIG. 3, the style-src directive 302 for the example CSP definition includes a section 304 for specifying source values. Source values 306 and 308 are examples of dynamic source values that are used to dynamically generate source values for a CSP header generated from the CSP definition during deployment. Each of these source values 306 and 308 have hashtags indicating the dynamic portion of the source values. The source values 306 and 308 provide examples that are dynamic at the top-level domain. However, as noted above, dynamic source values can also be dynamic at other levels, for instance at a second-level domain and/or a subdomain. Source values 310 and 312 are examples of static source values that remain unchanged for a CSP header generated from the CSP definition during deployment. As can be seen in FIG. 3, each of the dynamic source values 306 and 308 and the static source values 310 and 312 can include a wildcard character. In these examples, the wildcard characters are used such that the source values 306, 308, 310, 312 include subdomains.

CSP Deployment: The CSP management system 206 includes a frontend 212 that facilitates deployment of CSPs. When the user device 202 requests a web application, the frontend 212 receives the request and retrieves a CSP definition for the requested web application from the repository of CSP definitions. For instance, the frontend 212 can retrieve the CSP definition from the CSP definitions datastore 210 or a CSP cache 214 associated with the frontend 212.

The frontend 212 generates a CSP header as a response header based on the retrieved CSP definition, and provides the generated CSP header to the user device 202. The generated CSP header provides the set of directives specifying one or more source values for each directive as set forth in the CSP definition. For each dynamic source value in the CSP definition, the frontend 212 dynamically generates the source value included in the CSP header based on the domain of the requested web application. As noted above, a dynamic source value in the CSP header specifies a dynamic portion, which can be a top-level domain, a second-level domain, and/or a subdomain. Based on which portion of the dynamic source value is dynamic, the corresponding level of the domain of the requested web application is used to dynamically generate the source value included in the CSP header.

By way of example, in some cases, a CSP header could correspond with a web application that varies for different geographical region, with each region having a different top-level domain (e.g., .de, .ca, .co.jp, .co.uk, etc.). In this example, when a web application is requested for a particular geographical region, a dynamic source value having a dynamic top-level domain potion will result in a source value for the CSP header being generated with the top-level domain of the requested web application. Accordingly, when the web application for Canada is requested, a dynamic source value in a CSP definition would be used to generate a .ca source value in the CSP header returned in response. However, when the web application for the UK is requested, the dynamic source value in the CSP definition would be used to generate a .co.uk source value in the CSP header returned in response.

FIG. 4 provides an example CSP header 402 generated from a CSP definition. The CSP header 402 includes a style-src directive 404, as well as other directives (e.g., connect-src directive, script-src directive, frame-ancestors directive, default-src directive). The style-src directive 404 of the CSP header 402 was generated using the style-src directive 302 in the CSP definition example of FIG. 3. In the example of FIG. 4, the requested web application includes a top-level domain of .de (i.e., the web application for Germany). Accordingly, source values are generated for the CSP definition 402 using the .de top-level domain for any dynamic source values in the CSP definition having a dynamic top-level portion. For instance, the source value 406 (*ebay.de) has been generated from the dynamic source value 306 (*ebay.#ebaysite#), and the source value 408 (*.ebaystatic.de) has been generated from the dynamic source value 308 (*ebaystatic.#ebaysite#). The style-src 404 directive also includes the source value 410 (*ebaystatic.cn) corresponding with the static source value 310 (*ebaystatic.cn) and the source value 412 (*googleapis.com) corresponding with the static source value 312 (*googleapis.com). As can be seen from FIG. 4, each of the source values 406, 408, 410, 412 in the CSP header 402 includes a wildcard character based on the wildcard character being included in the corresponding dynamic sources values 306, 308 and static source values 310, 312 from the CSP definition 302.

CSP Violation Reporting: The CSP reporting service 216 of the CSP management system 206 receives CSP violations from user devices, such as the user device 202, and logs the CSP violations in a CSP violations datastore 218. CSP violations occur when a web application on a user device attempts to call a resource from a source that is not specified in the relevant directive from the CSP header for that web application. In some configurations, a CSP header is configured to include a URL for the CSP reporting service 216, which is used by the client device to route information when a CSP violation occurs. For instance, the CSP header 402 includes a portion "report-uri" that specifies the URL: "https://monitor.ebay.com/csp-report". When a web application attempts to call a source not specified in a relevant directive of the CSP header, the application (e.g., a web browser) executing the web application on the user device 202 calls the URL to provide information regarding the violation, including information identifying the violating source (i.e., the source that was attempted but not included in the relevant directive of the CSP header), as well as information identifying, for instance, the web application, the CSP that was violated, and/or the directive of the CSP that was violated.

As noted above, the CSP reporting service 216 stores a log of CSP violations in the CSP violations datastore 218. The log of CSP violations includes information regarding each CSP violation reported to the CSP reporting service 216. For instance, the log of CSP violations can store, for each CSP violation, information identifying the violating source, the web application that attempted to call the violating source, the CSP definition resulting in the violation, and the directive of the CSP definition resulting in the violation. The CSP manager service 208 interfaces with the CSP violations datastore 218 to access the violations information and generate reports that are provided to the admin device 204. In some instances, the CSP management system 206 incorporates a search engine, such as an Elasticsearch search engine, to allow an administrator to search the CSP violations. Among other things, the administrator can employ the information regarding violations logged in the CSP violations datastore 218 to update CSP definitions to address the violations.

In some cases, violating sources included in the violation logs are trusted sources. Trusted sources are ones that are known by the entity to be safe sources. In such cases, the CSP management system 206 facilitates updating CSP definitions to include those trusted sources, such that they do not trigger violations. In particular, the CSP management system 206 maintains a list of trusted sources for the entity. The list of trusted sources can include, for instance, the entity's own domains, as well as trusted third-party domains (e.g., trusted domains for payments, advertisements, tracking, security, etc.). In accordance with some aspects, the CSP manager service 208 compares sources listed in the violation logs in the CSP violations datastore 218 against the list of trusted sources to identify trusted sources in the violation logs.

Figure 5:
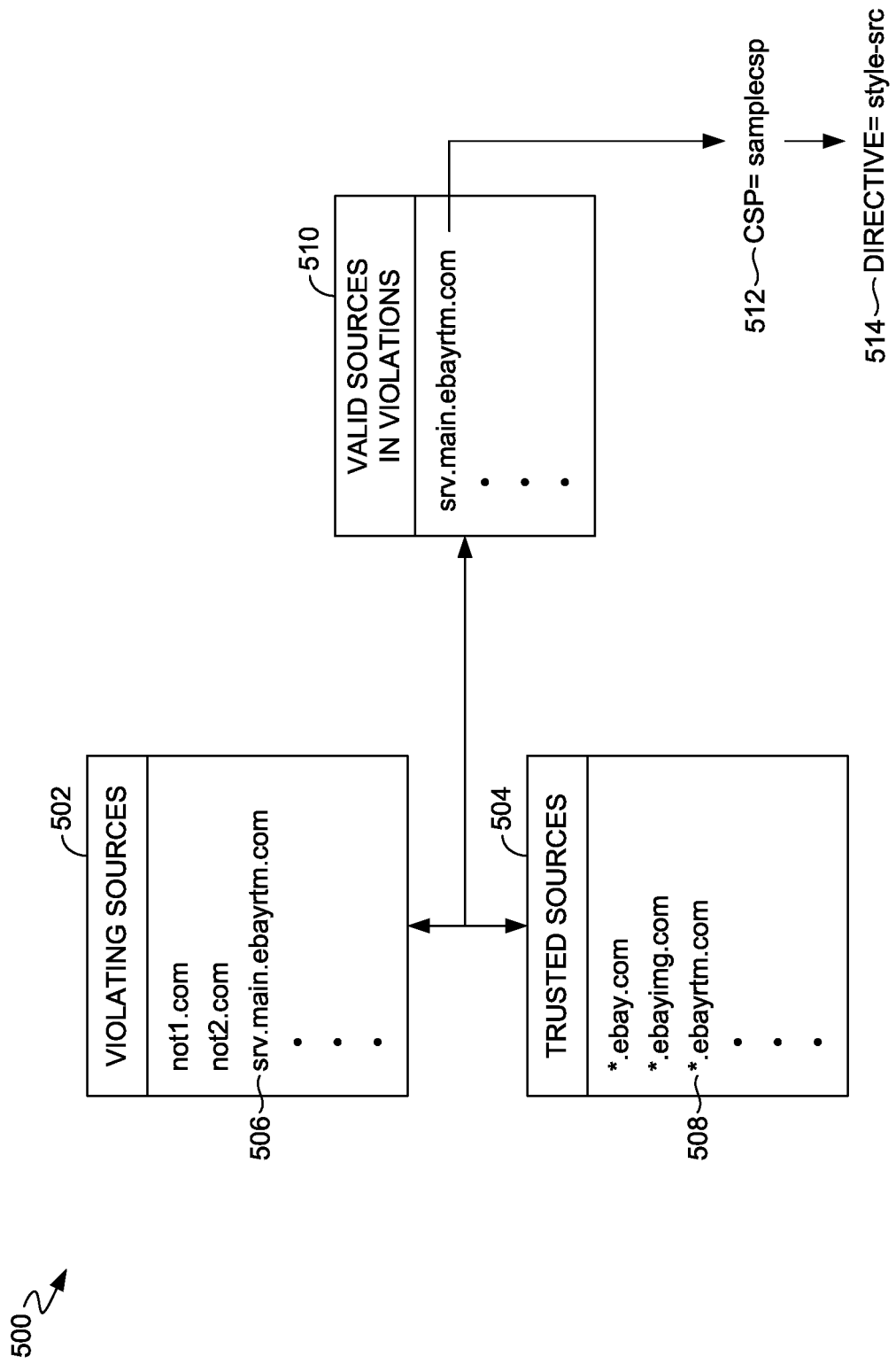
FIG. 5 is a diagram showing an example of comparing violating sources with a list of trusted sources in accordance with some implementations of the present disclosure.

By way of example to illustrate, FIG. 5 provides a diagram showing an example in which trusted sources are identified in violation logs. In particular, FIG. 5 shows a list of violating sources 502 from violations logs (e.g., stored in the CSP violations datastore 218 of FIG. 2) and a list of trusted sources 504. As shown in FIG. 5, the list of violating sources 502 includes the violating source 506, "srv.main.ebayrtm.com", and the list of trusted sources 508 includes the trusted source 508 "*.ebayrtm.com". Given that the violating source 506 matches the trusted source 508 (based on the wildcard character in the trusted source 508—i.e., srv-.main.ebayrtm.com is a subdomain matching *ebayrtm-.com), the violating source 506 is added to a list of valid sources in violations 510. As shown in FIG. 5, the violating source 506 is associated with a CSP definition 512 ("samplecsp"), and a particular directive 514 ("style-src") of the CSP definition 512 (i.e., the relevant directive and CSP definition that led to the violation).

When a match is found between violating sources and the list of trusted sources, the CSP management system 206 facilitates updating the CSP definition corresponding with the CSP header that caused the violation such that the CSP definition includes the trusted source. For instance, in the context of the example in FIG. 5, based on identifying "srv.main.ebayrtm.com" as matching a trusted source, the directive "style-src" of the CSP definition "samplecsp" could be updated to include the source "srv.main.ebayrtm-.com" (or "*.ebayrtm.com").

In some configurations, updating of a CSP definition is fully automatic. In particular, the CSP manager service 208 of FIG. 2 updates the relevant directive of the CSP definition to include the identified source. For instance, continuing the example of FIG. 5, the CSP manager service 208 would automatically add "srv.main.ebayrtm.com" (or "*.ebayrtm-.com") as a source value in the "style-src" directive of the "samplecsp" CSP definition.

In some configurations, updating of a CSP definition is semi-automatic. In particular, the CSP manager server 208 provides a user interface to the admin device 204 with information identifying the identified match and providing an option to approve updating a corresponding CSP definition. If the administer selects the option to approve the update, the CSP manager service 208 updates the relevant directive of the CSP definition to include the identified source. For instance, continuing the example of FIG. 5, the CSP manager service 208 could provide the admin device 204 a user interface indicating that "srv.main.ebayrtm.com" triggered a violation for the "style-src" directive of the "samplecsp" CSP and a user interface element for selecting to update the corresponding CSP definition. If the user interface element is selected by the administrator, the CSP manager server 208 then adds "srv.main.ebayrtm.com" (or "*.ebayrtm.com") as a source value in the "style-src" directive of the "samplecsp" CSP definition.

In further configurations, updating of a CSP definition is manual. In particular, the CSP manager service 208 provides a user interface to the admin device 204 with information identifying the identified match (e.g., information identifying the violating source that matched a trusted source, the CSP definition that resulted in the violation, and/or the directive of the CSP that resulted in the violation), and the administrator can decide whether to manually update the corresponding CSP definition based on the provided information. For instance, continuing the example of FIG. 5, the CSP manager service 208 could provide the admin device 204 a user interface indicating that "srv.main.ebayrtm.com" triggered a violation for the "style-src" directive of the "samplecsp" CSP. The administrator can review the information and determine whether to manually update the corresponding CSP definition.

Example Method for Self-Healing CSPs

Figure 6:
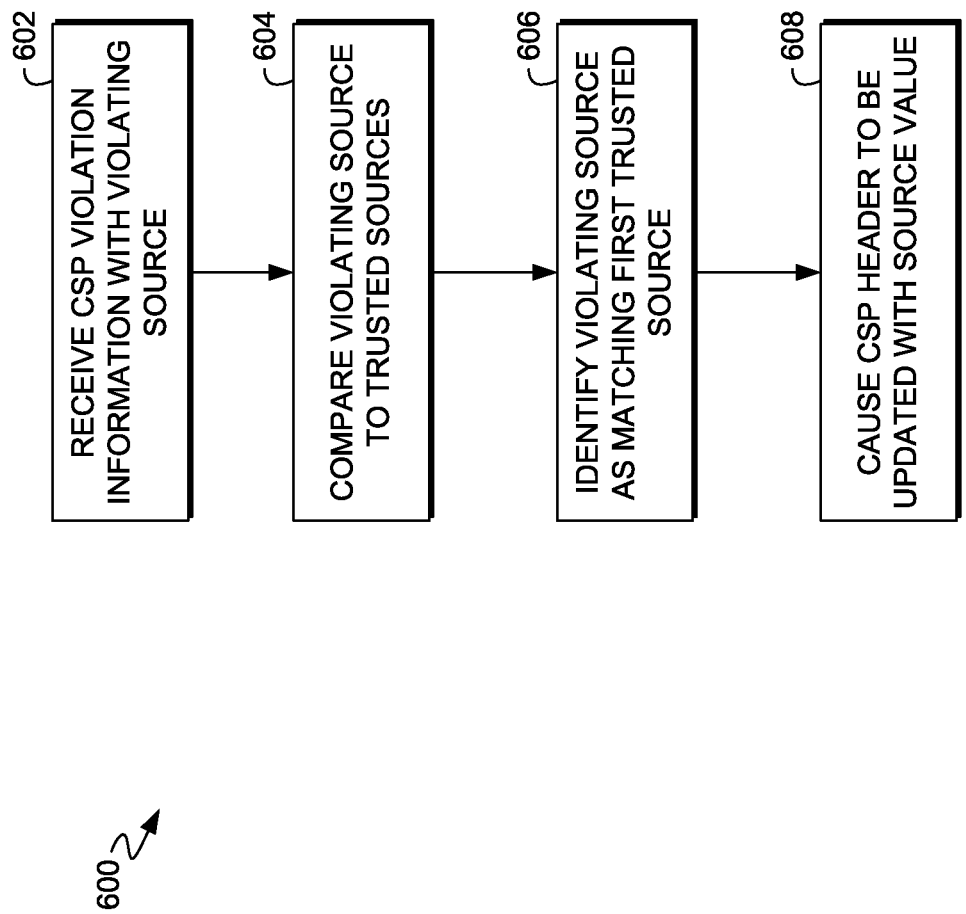
FIG. 6 is a flow diagram showing a method for updating a CSP based on a CSP violation in accordance with some implementations of the present disclosure.

With reference now to FIG. 6, a flow diagram is provided that illustrates a method 600 for updating a CSP based on a CSP violation. The method 600 can be performed, for instance, by the CSP management system 206 of FIG. 2. Each block of the method 600 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, information for a CSP violation is received. The CSP violation information identifies a CSP header that resulted in the CSP violation and a violating source. As discussed herein, a CSP violation occurs when an application (e.g., a web browser) executing a web application attempts to call a source not included in a relevant directive of a CSP header. That source is identified as a violating source.

The violating source for the CSP violation is compared against a list of trusted sources, as shown at block 604. The list of trusted sources includes safe sources for an entity, including for instance, the entity's own sources and/or known third-party sources. Based on the comparison, a first trusted source in the list of trusted sources is identified as matching the violating source for the CSP violation, as shown at block 606.

In response to identifying the first trusted source as matching the violating source, a CSP definition associated with the CSP header is caused to be updated to include a source value based on the violating source or the first trusted source, as shown at block 608. This provides an updated CSP definition that includes that source value. As such, when the CSP definition is subsequently used to generate a CSP header for a web application in response to a request for the web application from a client device, the CSP header includes a source value such that if the web application attempts to call the source corresponding with the previous violating source, the source will no longer cause a violation.

Updating of the CSP definition at block 608 can be performed automatically, semi-automatically or manually. When performed automatically, the system (e.g., via the CSP manager service 208 of FIG. 2) automatically identifies the relevant directive of the CSP header (e.g., based on the information regarding the CSP violation) and adds a source value to that directive. The source value is based on the violating source and/or the matching first trusted source. For instance, using the example of FIG. 5, the "style-src" directive of the "samplecsp" CSP definition could be automatically updated by the system by adding a source value of "srv.main.ebayrtm.com" or "*.ebayrtm.com". When performed semi-automatically, a user interface is initially provided to an admin device (e.g., the admin device 204 of FIG. 2) that identifies the violating source as matching the first trusted source and includes a user interface element for selecting to update the CSP definition. If the user interface element is selected by the administrator, the system automatically updates the CSP definition to include the source value. When performed manually, a user interface is provided to an admin device (e.g., the admin device 204 of FIG. 2) that identifies the violating source as matching the first trusted source. The administrator can review the information and employ the admin device to access the relevant CSP definition from the CSP repository and update the CSP definition by adding the source value.

Exemplary Operating Environment

Figure 7:
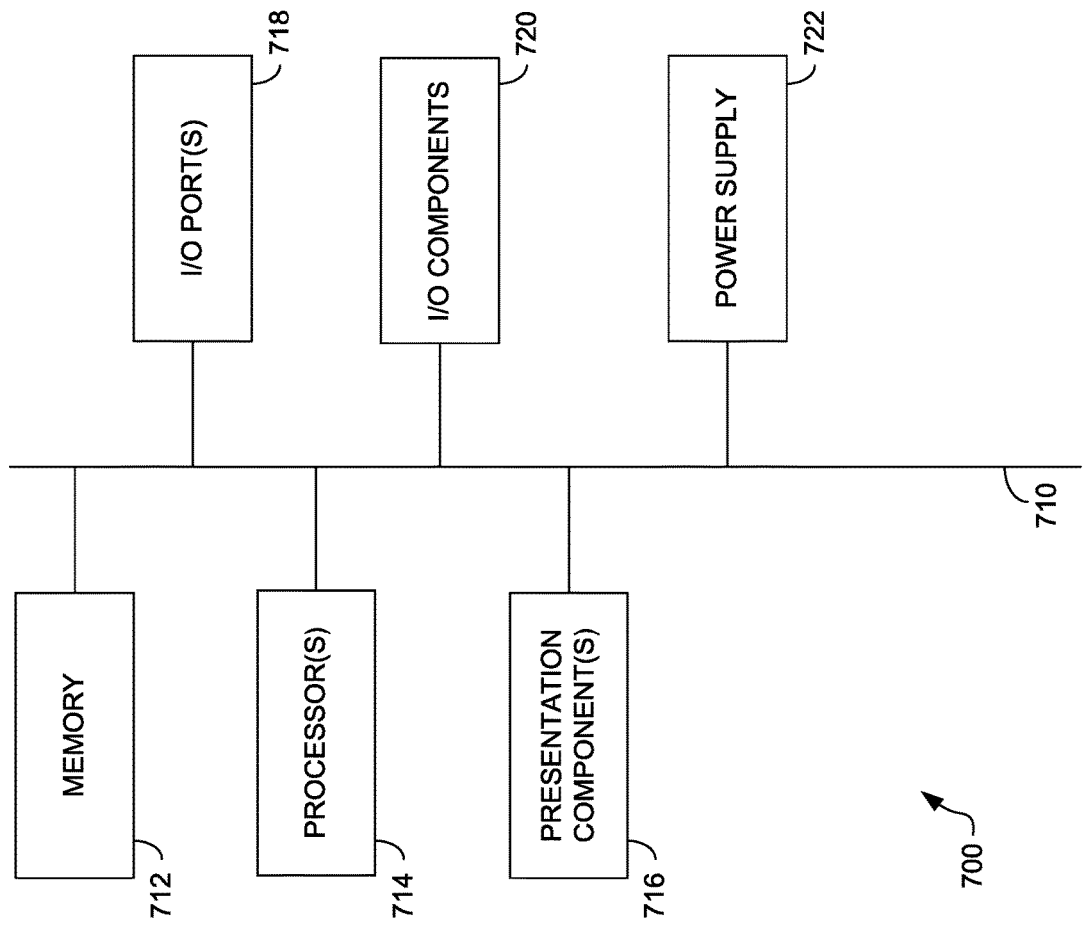
FIG. 7 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 7 in particular, an exemplary operating environment for implementing embodiments of the present technology is shown and designated generally as computing device 700. Computing device 700 is but one example of a suitable computing environment and is not intended to suggest any limitation as to the scope of use or functionality of the technology. Neither should the computing device 700 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what can be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media can comprise computer storage media and communication media.

Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory can be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which can be built in. Illustrative components include a microphone, joystick, game pad, satellite dish, scanner, printer, wireless device, etc. The I/O components 720 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 can be equipped with depth cameras, such as, stereoscopic camera systems, infrared camera systems, RGB camera systems, and combinations of these for gesture detection and recognition. Additionally, the computing device 700 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. A computer-implemented method comprising:
    receiving, by at least one server from one or more servers, content security policy (CSP) violation information identifying a CSP violation for a CSP header and a violating source for the CSP violation;
    comparing, by at least one server from the one or more servers, the violating source for the CSP violation to a list of trusted sources;
    identifying, by at least one server of the one or more services, a first trusted source in the list of trusted sources matching the violating source for the CSP violation;
    responsive to identifying the first trusted source as matching the violating source, causing, by at least one server from the one or more servers, a CSP definition associated with the CSP header to include a source value based on the violating source or the first trusted source to provide an updated CSP definition in a repository of CSP definitions;
    receiving, by a frontend server, a webpage request from a user device requesting a webpage;
    in response to receiving the webpage request, retrieving, by the frontend server, the updated CSP definition from the repository of CSP definitions;
    generating, by the frontend server, an updated CSP header based on the updated CSP definition, the updated CSP header including the source value; and providing, by the frontend server to the user device, the CSP header as a response header for the requested webpage.

2. The computer-implemented method of claim 1, wherein the CSP violation information identifies a directive of the CSP header; and wherein the directive of the CSP header is updated to include the source value.

3. The computer-implemented method of claim 1, wherein causing the CSP definition associated with the CSP header to include the source value comprises:
automatically updating the CSP definition to include the source value to provide the updated CSP definition.

4. The computer-implemented method of claim 3, wherein automatically updating the CSP definition to include the source value comprises:
identifying a directive corresponding to the CSP violation; and
automatically updating the directive in the CSP definition to include the source value.

5. The computer-implemented method of claim 1, wherein causing the CSP definition associated with the CSP header to include the source value comprises:
providing, to an admin device, a user interface with a notification regarding the CSP violation that identifies the violating source as matching the first trusted source.

6. The computer-implemented method of claim 5, wherein the user interface comprises a user interface element for approving updating of the CSP definition, and wherein causing the CSP definition associated with the CSP header to include the source value further comprises:
receiving, via the user interface element, input approving updating of the CSP definition; and
responsive to the input, updating the CSP definition to include the source value to provide the updated CSP definition.

7. One or more computer storage media storing computer-useable instructions that, when used by a computing device, cause the computing device to perform operations, the operations comprising:
receiving, by at least one server from one or more servers, content security policy (CSP) violation information identifying a CSP violation for a CSP header and a violating source for the CSP violation;
comparing, by at least one server from the one or more servers, the violating source for the CSP violation to a list of trusted sources;
identifying, by at least one server of the one or more services, a first trusted source in the list of trusted sources matching the violating source for the CSP violation;
responsive to identifying the first trusted source as matching the violating source, causing, by at least one server from the one or more servers, a CSP definition associated with the CSP header to include a source value based on the violating source or the first trusted source to provide an updated CSP definition in a repository of CSP definitions;
receiving, by a frontend server, a webpage request from a user device requesting a webpage;
in response to receiving the webpage request, retrieving, by the frontend server, the updated CSP definition from the repository of CSP definitions;
generating, by the frontend server, an updated CSP header based on the updated CSP definition, the updated CSP header including the source value; and providing, by the frontend server to the user device, the CSP header as a response header for the requested webpage.

8. The one or more computer storage media of claim 7, wherein the CSP violation information identifies a directive of the CSP header; and wherein the directive of the CSP header is updated to include the source value.

9. The one or more computer storage media of claim 7, wherein causing the CSP definition associated with the CSP header to include the source value comprises:
automatically updating the CSP definition to include the source value to provide the updated CSP definition.

10. The one or more computer storage media of claim 9, wherein automatically updating the CSP definition to include the source value comprises:
identifying a directive corresponding to the CSP violation; and
automatically updating the directive in the CSP definition to include the source value.

11. The one or more computer storage media of claim 7, wherein causing the CSP definition associated with the CSP header to include the source value comprises:
providing, to an admin device, a user interface with a notification regarding the CSP violation that identifies the violating source as matching the first trusted source.

12. The one or more computer storage media of claim 11, wherein the user interface comprises a user interface element for approving updating of the CSP definition, and wherein causing the CSP definition associated with the CSP header to include the source value further comprises:
receiving, via the user interface element, input approving updating of the CSP definition; and
responsive to the input, updating the CSP definition to include the source value to provide the updated CSP definition.

13. A computer system comprising:
one or more processors; and
one or more computer storage media storing computer-useable instructions that, when used by the one or more processors, causes the one or more processors to perform operations comprising:
receiving, by at least one server from one or more servers, content security policy (CSP) violation information identifying a CSP violation for a CSP header and a violating source for the CSP violation;
comparing, by at least one server from the one or more servers, the violating source for the CSP violation to a list of trusted sources;
identifying, by at least one server of the one or more services, a first trusted source in the list of trusted sources matching the violating source for the CSP violation;
responsive to identifying the first trusted source as matching the violating source, causing, by at least one server from the one or more servers, a CSP definition associated with the CSP header to include a source value based on the violating source or the first trusted source to provide an updated CSP definition in a repository of CSP definitions;
receiving, by a frontend server, a webpage request from a user device requesting a webpage;
in response to receiving the webpage request, retrieving, by the frontend server, the updated CSP definition from the repository of CSP definitions;
generating, by the frontend server, an updated CSP header based on the updated CSP definition, the updated CSP header including the source value; and providing, by the frontend server to the user device, the CSP header as a response header for the requested webpage.

14. The computer system of claim 13, wherein causing the CSP definition associated with the CSP header to include the source value comprises:

automatically updating the CSP definition to include the source value to provide the updated CSP definition.

15. The computer system of claim 14, wherein automatically updating the CSP definition to include the source value comprises:

identifying a directive corresponding to the CSP violation; and automatically updating the directive in the CSP definition to include the source value.

16. The computer system of claim 13, wherein causing the CSP definition associated with the CSP header to include the source value comprises:

providing, to an admin device, a user interface with a notification regarding the CSP violation that identifies the violating source as matching the first trusted source.

17. The computer system of claim 16, wherein the user interface comprises a user interface element for approving updating of the CSP definition, and wherein causing the CSP definition associated with the CSP header to include the source value further comprises:

receiving, via the user interface element, input approving updating of the CSP definition; and responsive to the input, updating the CSP definition to include the source value to provide the updated CSP definition.

* * * * *